United States Patent [19]

Wolf et al.

[11] 3,852,241

[45] Dec. 3, 1974

[54] AROMATIC COPOLYAMIDES CONTAINING QUINAZOLINEDIONE RINGS AND THREADS THEREOF WITH HIGH MODULUS OF ELASTICITY AND HIGH TENSILE STRENGTH

[75] Inventors: Gerhard Dieter Wolf; Hans Egon Künzel, both of Dormagen; Günter Blankenstein, Stommeln; Francis Bentz, Cologne, all of Germany

[73] Assignee: Bayer Aktiengesellschaft, Leverkusen, Germany

[22] Filed: Oct. 4, 1973

[21] Appl. No.: 403,390

[30] Foreign Application Priority Data
Oct. 4, 1972 Germany............................ 2248663

[52] U.S. Cl........ 260/47 CZ, 260/30.2, 260/30.6 R, 260/30.8 R, 260/30.8 DS, 260/32.4, 260/32.6 N, 260/78 R
[51] Int. Cl............................................. C08g 20/20
[58] Field of Search....................... 260/47 CZ, 78 R

[56] References Cited
UNITED STATES PATENTS
3,527,732  9/1970  Wolf et al............................. 260/47
3,671,614  6/1972  Kunzel et al......................... 260/47

Primary Examiner—Lester L. Lee
Attorney, Agent, or Firm—Plumley & Tyner

[57] ABSTRACT

The invention relates to copolyamides having an extremely low capacity for moisture absorption of 1 to 3.5 % but remarkably high tensile strengths of between 7 and 22 g/dtex and moduli of elasticity of between 6,000 and 14,000 kg/wt/mm². The high-molecular weight aromatic copolyamides consist of 50 to 95 mols-%, preferably 70 to 90 mols-% of structural units of the general formula I and 5 to 50 mols-%, preferably 10 to 30 mols-% of structural units of the following general formula II which contains 2,4-(1H,3H)-quinazolinedione ring systems;

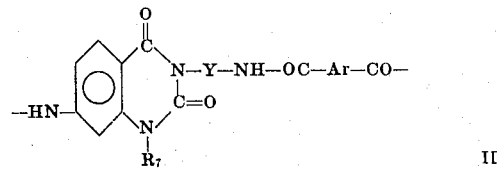

The general symbols of which are explained in the following specification.

7 Claims, No Drawings

AROMATIC COPOLYAMIDES CONTAINING QUINAZOLINEDIONE RINGS AND THREADS THEREOF WITH HIGH MODULUS OF ELASTICITY AND HIGH TENSILE STRENGTH

This invention relates to aromatic copolyamides which contain quinazolinedione units and to threads and fibres with very high tensile strengths and high moduli of elasticity produced from them.

Threads and fibres which have a high modulus of elasticity are already known. They are mainly polycondensates of p-aminobenzoyl chloride hydrochloride (German Offenlegungsschrift No. 1,924,736) and of p-aminobenzhydrazide and terephthalic acid dichloride (German Offenlegungsschrift No. 1,938,282). Fibres produced from these polycondensates have a very high modulus of elasticity which is in some cases higher than that of glass fibres. Compared with glass fibres, these fibres have the advantage of having a lower density. The specific modulus of elasticity of these fibres is therefore substantially higher than that of glass fibres. The disadvantage of these polycondensates, however, is that they are only sparingly soluble. To prepare solutions in polar organic solvents, it is necessary to add considerable quantities of inorganic salts (e.g. lithium chloride) to these solvents, and these salts must subsequently be removed from the threads in time-consuming after treatment processes because they reduce the resistance of the polycondensates to elevated temperatures.

Other threads and fibres with a high modulus of elasticity have become known which consist of high-molecular weight aromatic polyamides which are soluble in polar organic solvents and have recurrent structural units of the following general formula I

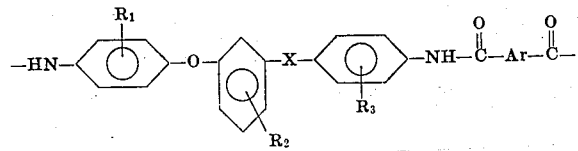

in which
X denotes the group

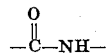

or

$R_1$ and $R_2$ are independent of each other and represent hydrogen, $C_1$–$C_4$ alkoxy or alkyl groups or halogen atoms,
$R_3$ represents hydrogen, halogen, a $C_1$–$C_4$ alkyl or alkoxy group, a nitrile group or a $COOR_4$ or $-CONR_5R_6$ group and
Ar represents a divalent aromatic group
$R_4$ representing hydrogen or a $C_1$–$C_4$ alkyl group and
$R_5$ and $R_6$ representing, independently of each other, either hydrogen or $C_1$–$C_4$ alkyl groups or aryl groups.

Threads produced from polycondensates of formula I were found to have tensile strengths of 5 to 10 g/dtex and moduli of elasticity of between 4000 and 10,000 kg.wt./mm².

Polyamides which contain quinazolinedione units are also already known (see German Offenlegungsschrift No. 1,720,686). They contain the recurrent structural unit of formula II

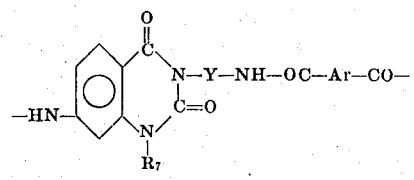

in which
$R_7$ represents hydrogen or a $C_1$–$C_4$ alkyl group,
Y represents a bivalent aromatic group consisting of one or more condensed aromatic rings or aromatic rings which are joined together by a single bond or by a $-CO-$, $-CR_7R_7-$, $-O-$, $-S-$ or $-SO_2-$ group, and their alkyl substitution or halogen substitution products, and
Ar represents a divalent aromatic group.

Threads and fibres produced from these polyamides have tensile strengths of between 3.5 and 6 g/dtex and moduli of elasticity of between 1,000 and 1,300 kg.wt./mm². The water absorption capacity of these fibres is exceptionally high and amounts to 9 to 13 % (determined at 20°C and 65 % relative humidity).

When copolyamides are produced from the diamines on which homocondensates I and II are based, one would expect the products to have a looser structure and therefore relatively high water absorption capacity but relatively low tensile strengths and moduli of elasticity. It has now surprisingly been found, however, that the very opposite is the case, copolyamides produced in this way having an extremely low capacity for moisture absorption of 1 to 3.5 percent but remarkably high tensile strengths of between 7 and 22 g/dtex and moduli of elasticity of between 6000 and 14,000 kg.wt/mm².

This invention therefore relates to high-molecular weight aromatic copolyamides which consist of 50 to 95 mols-%, preferably 70 to 90 mols-% of structural units of the general formula I

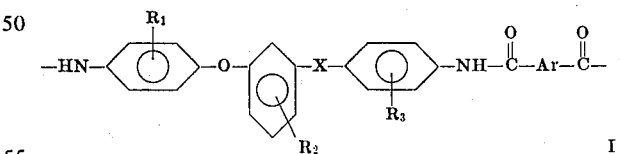

in which
X represents the group

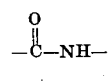

or

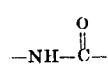

$R_1$ and $R_2$ are independent of each other and represent hydrogen, $C_1$–$C_4$ alkoxy or alkyl groups or halogen atoms, $R_3$ represents hydrogen, halogen, a $C_1$–$C_4$ alkyl or alkoxy group, a nitrile group or a $COOR_4$— or —$CONR_5R_6$ group and Ar represents a divalent aromatic group, $R_4$ representing hydrogen or a $C_1$–$C_4$ alkyl group and $R_5$ and $R_6$ independently of each other, representing hydrogen or $C_1$–$C_4$ alkyl groups or aryl groups, and 5 to 50 mols-%, preferably 10 to 30 mols-% of structural units of the following general formula II which contains 2,4-(1H, 3H)-quinazolinedione ring systems:

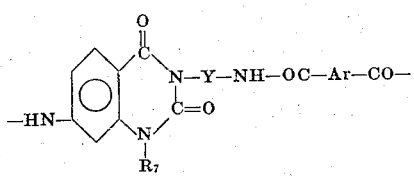

II in which $R_7$ represents hydrogen or a $C_1$–$C_4$ alkyl group,

Y represents a bivalent aromatic group consisting of one or more condensed aromatic rings or aromatic rings which are joined together by a single bond or by a —CO—, —$CR_7R_7$—, —O—, —S—, or —$SO_2$- group, and their alkyl substitution or halogen substitution products, and Ar represents a divalent aromatic group, the copolyamides having a relative solution viscosity (determined on a 0.5% solution of the copolyamide in concentrated sulphuric acid at 25°C) of 1.5 to 4.

If $R_1$, $R_2$ or $R_3$ is halogen, then the halogen is preferably chlorine. If $R_5$ and $R_6$ are aryl groups, they are preferably phenyl or phenyl groups which are substituted with chlorine or with $C_1$–$C_4$ alkyl groups.

The copolyamides according to the invention are therefore made up of 3 components:

The first component consists of one or more fully aromatic diamines of the general formula

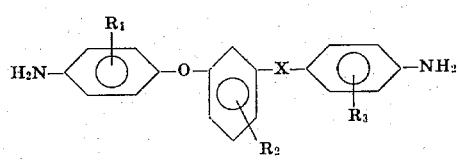

III in which $R_1$, $R_2$, $R_3$ and X have the meanings defined above.

The following compounds are given as examples:

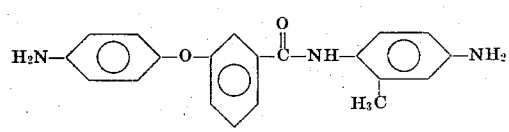

(1)

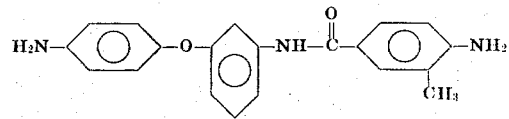

(2)

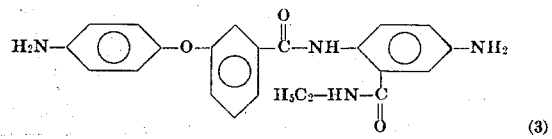

(3)

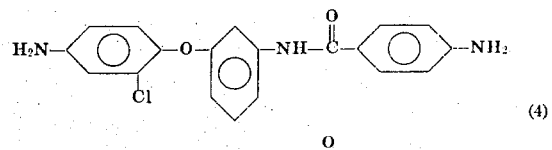

(4)

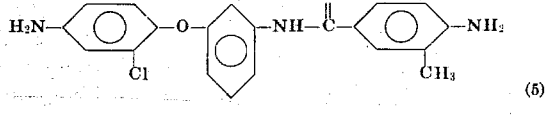

(5)

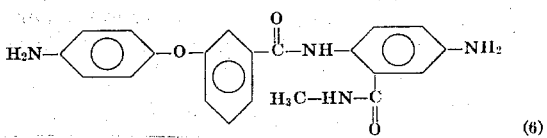

(6)

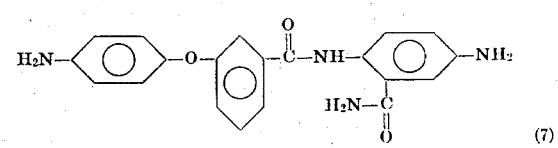

(7)

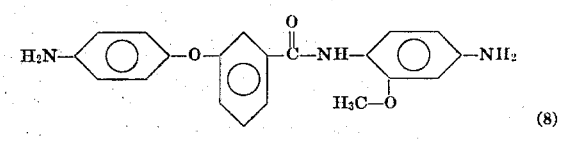

(8)

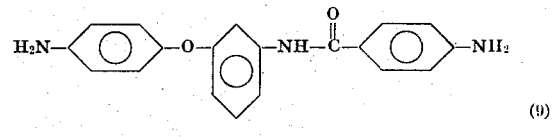

(9)

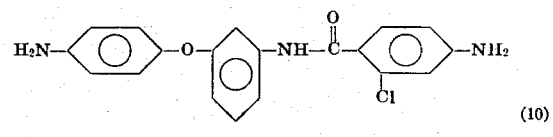

(10)

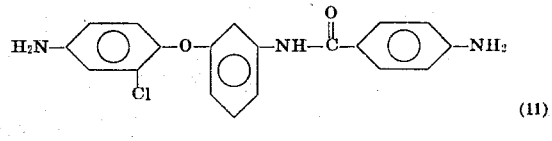

(11)

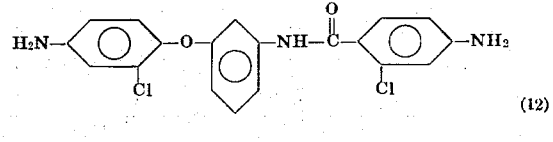

(12)

These diamines may be prepared by known methods, for example by reacting 3-(4'-nitrophenoxy)-benzoic acid chloride with the corresponding 4-nitroaniline which may be substituted and reducing the resulting dinitro compound, or they may be obtained from 2-amino-4'-nitrodiphenylethers, which may be substituted, by reacting them with 4-nitrobenzoyl chloride or with substituted 4-nitrobenzoyl chloride, followed by reduction of the dinitro compounds. These dinitro compounds may also be prepared from 4-nitrophenoxybenzoic acid and 4-nitroaniline both of which may be substituted or from aminonitrodiphenylethers and 4-nitrobenzoic acid both of which may be substituted by reacting them in N-methyl pyrrolidone with the presence of P$_2$O$_5$.

The second component consists of one or more diamines of the general formula

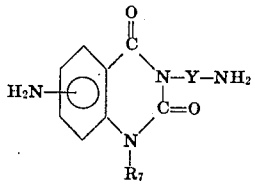

IV in which

R$_7$ and Y have the meanings defined above.

The following diamines are given as examples:

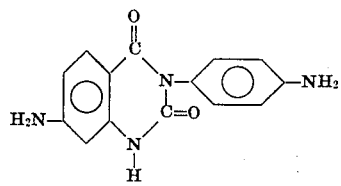

(13)

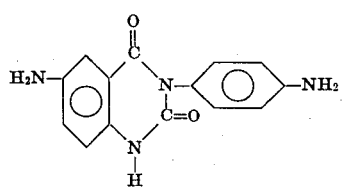

(14)

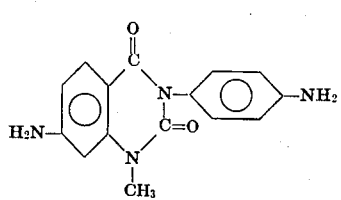

(15)

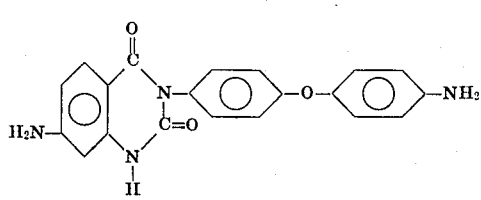

(16)

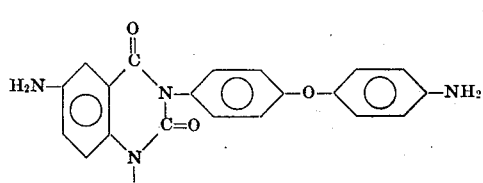

(17)

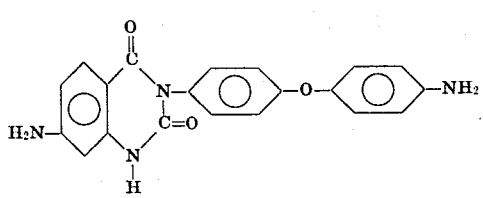

(18)

-Continued

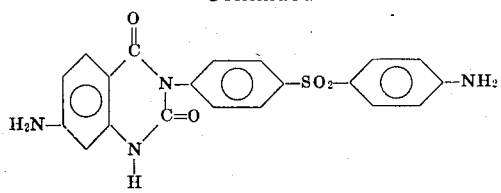

(19)

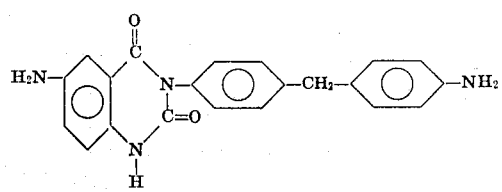

(20)

These diamines are added in proportions of 5 to 50 mols-%, preferably 10 to 30 mols-%, based on the total quantity of diamines used, in order to obtain threads and fibres with exceptionally high tensile strengths and moduli of elasticity.

According to German Offenlegungsschrift No. 1,720,686, these diamines which contain 2,4-quinazoline dione ring systems may be obtained, for example, by reacting 4- or 5-nitroanthranilic acid esters with aromatic isocyanates which contain a nitro group, reacting the resulting urea derivatives in o-dichlorobenzene/pyridine (20:1) to effect ring closure and then reducing the nitro groups. The same diamines containing 2,4-quinazoline dione ring systems may also be obtained, for example, by a modified process comprising reacting 4- or 5-nitroanthrinilic acid with aromatic isocyanates which contain nitro groups, cyclising the o-ureidobenzoic acids which are produced as intermediate products by reacting them in N-methyl pyrrolidone in the presence of P$_2$O$_5$ or e.g. in dimethylformamide with the aid of phosgene and then catalytically reducing the nitro groups (see German Offenlegungsschriften Nos. 1,802,079 and 2,103,877).

The third component consists of aromatic dicarboxylic acid dihalides of the general formula Hal-OC-Ar-CO-Hal      V in which Hal denotes Cl or Br and Ar has the meaning defined above.

The following are given as examples: isophthalic acid dichloride, terephthalic acid dichloride, diphenyldicarboxylic acid-4,4'-dichloride, naphthalenedicarboxylic acid-1,5-dichloride, naphthalenedicarboxylic acid-2,6-dichloride, diphenyletherdicarboxylic acid-4,4'-dichloride, diphenylsulphonedicarboxylic acid-4,4'-dichloride, benzophenonedicarboxylic acid-4,4'-dichloride and the corresponding dibromides as well as the alkyl substitution and halogen substitution products of the above mentioned acid dihalides.

Terephthalic acid dichloride has also proved to be particularly suitable for the process according to the invention.

Polycondensation of the 3 components described above is carried out by processes known per se such as interface polycondensation but is preferably carried out by a process of solution polycondensation in a polar organic solvent such as an N,N-dialkyl-carboxylic acid amide, preferably N,N-dimethylacetamide or an N-alkyl-substituted lactam, preferably N-methyl pyrrolidone, or in tetramethyl urea or hexamethyl phosphoric acid triamide, etc. or in a mixture of such polar aprotic solvents without additional acid acceptors but optionally in the presence of a solubilising agent such as an alkali metal or alkaline earth metal halide in cases where these are necessary to keep the copolyamides in solution as they are being formed. Condensation is carried out at a temperature of between −30°C and 150°C, preferably between −10°C and 30°C. The reaction time may be between 1 hour and 30 hours. The solids content of the solution is 5 to 40 %, preferably 10 to 25 %. To obtain reaction products with high molecular weights, it is advisable to use the sum of diamines and dicarboxylic acid dichloride components in equimolar quantities although polycondensation may in principle also be carried out with an excess or a less than equivalent amount of dicarboxylic acid dichloride. The dicarboxylic acid dichloride may be added to the solution or suspension of the diamines in the solvent in several small portions spread out over a considerable period of time. In some cases, however, it is advisable to add the whole quantity of dicarboxylic acid dichloride all at once, preferably with cooling. The polyamides may be spun directly from the polycondensation solution, optionally after first neutralising the hydrochloric acid, e.g. with ethylene oxide, propylene oxide or amines, or they may be processed into threads or fibres after precipitation from the polycondensation solution with a precipitating agent such as water, an alcohol or a ketone, drying and then dissolving the precipitate in the given polar solvent or in a dialkyl sulphoxide such as dimethyl sulphoxide.

Spinning may, in principle, be carried out by the usual methods of dry or wet spinning but the polyamides are preferably spun from solutions in dimethylacetamide or N-methyl pyrrolidone which have a polyamide solids content of between 12 and 25 %. Solubilising agent, if necessary, is preferably calcium chloride or lithium chloride and is used in a concentration of between 3 and 12 %. Viscosities of the spinning solutions are preferably between 500 and 1,100 Poises (determined at 20°C in a rotation viscosimeter) although solutions with viscosities of up to 2,500 Poises can be spun without difficulty. The relative viscosity of the polyamides is between $\eta_{rel.} = 1.5$ and 4 but preferably $\eta_{rel.} = 1.8$ to 4 (determined on a 0.5 % solution in concentrated sulphuric acid at 25°C).

If the wet spinning process is employed, the threads are coagulated in an aqueous precipitation bath at 50° to 60°C and drawn off from a 10 aperture die (aperture diameter 0.1 mm) at a rate of 10 to 20 metres per minute. In the case of the dry spinning process, the threads are spun through the die (aperture diameter 0.1 mm) into a spinning shaft charged with hot air at about 200°C and the resulting thread is drawn off at the rate of 100 metres per minute.

The after-treatment is essential for producing threads with good textile properties. Both wet spun and dry spun threads are advantageously first prestretched in boiling water to a ratio of between 1:1.2 and 1:1.7 and then washed in hot water at 60°C and dried. The final stretching operation is then carried out at a temperature of 440° to 520°C with a stretching ratio of between 1:6 and 1:12.

The tensile strengths of the stretched threads were between 7 and 22 g/dtex at 1–3% elongation. The moduli of elasticity were found to be between 6,000 and 14,000 kg.wt./mm².

The following examples are to further illustrate the invention without limiting it.

EXAMPLE 1

153.2 parts by weight of 3-(p-amino-phenoxy)-2'-methyl-4'-aminobenzanilide of the formula

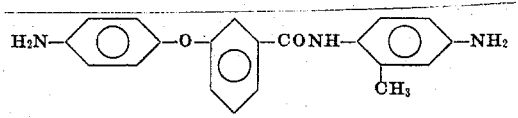

and 10.7 parts by weight of 3-(p-aminophenyl)-7-amino-2,4-(1H,3H)-quinazolinedione (8 mols-% based on the total quantity of diamine) were dissolved in 820 parts by weight of anhydrous dimethylacetamide. 101.5 parts by weight of terephthalic acid dichloride were added in 3 portions over a period of about 2 hours at room temperature. When all the terephthalic acid dichloride had been added, the reaction mixture was diluted with 610 parts by weight of dimethylacetamide and then stirred for 6 hours at room temperature. 58 parts by weight of propylene oxide were then added dropwise to neutralise the hydrochloric acid formed. The neutral solution had a viscosity of 950 Poises at 20°C. The relative viscosity of the polymer determined on a 0.5 % solution in concentrated sulphuric acid of a sample of polyamide which had been precipitated with water and dried at 120°C was found to be 2.56. The polyamide solution, which had a polyamide content of about 14 %, was spun into a water bath at 20°C at a draw-off rate of 10 metres per minute. The threads were first prestretched to a ratio of 1:1.3 in boiling water and after they had been dried they were finally stretched to a ratio of 1:9 on rollers at temperatures of between 460°C and 470°C.

The threads were found to have the following properties:

| | |
|---|---|
| Tensile strength: | 9–12 g/dtex |
| Elongation on tearing: | 1.5 – 2% |
| Modulus of elasticity: | 9550 ± 1000 kg.wt./cm² |

The values given for the moduli of elasticity are average values obtained from five measurements.

Moisture absorption: 1.3 %.

To determine the moisture absorption capacity, the fibres were washed at 300°C, dried and then exposed for 24 hours to an atmosphere of 20°C and 65% relative humidity to enable them to absorb moisture. The fibres are then dried in a vacuum at 80°C and the moisture absorption is calculated as the absorption at equilibrium in % by weight of the absolutely dry fibre.

EXAMPLE 2

250 parts by weight of 3-(p-amino-phenoxy)-2'-methyl-4'-aminobenzanilide and 67 parts by weight of 3-(p-aminophenyl)-7-amino-2,4-(1H,3H)-quinazolinedione (25 mols-% based on the total quantity of diamine) were dissolved in 1,560 parts by weight of anhydrous N-methylpyrrolidone, and 203 parts by weight of terephthalic acid dichloride were added portionwise at room temperature. A highly viscous solution was obtained which was gradually diluted with an additional 1,450 parts by weight of N-methyl pyrrolidone. The mixture was then stirred for a further 6 hours at room temperature and 37 parts by weight calcium hydroxide and 58 parts by weight of propylene oxide were then added to neutralise the hydrochloric acid formed. The neutral solution had a viscosity of 1,940 Poises. The solids content was about 13 %. This solution was spun wet and the threads obtained were first prestretched to 1:1.3 in boiling water and, after drying, they were then further stretched in the ratio of 1:7.5 on a roller at a temperature of between 440° and 460°C.

$\eta_{rel.}$ = 1.79 (determined on a 0.05 % solution in concentrated sulphuric acid). The threads were found to have the following properties:

| | |
|---|---|
| Tensile strength | 13 – 16 g/dtex |
| Elongation on tearing: | 2 – 3 % |
| Modulus of elasticity: | 9300 ± 940 kg.wt./mm² |
| Moisture absorption: | 2.3 %. |

EXAMPLE 3

283 parts by weight of 3-(p-aminophenoxy)-2'-methyl-4'-aminobenzanilide, 42 parts by weight of 3-(p-aminophenyl)-7-amino-2,4-(1H,3H)-quinazolinedione (15 mols-% based on the total quantity of diamine) and 203 parts by weight of terephthalic acid dichloride were polycondensed in 1,600 parts by weight of N-methyl pyrrolidone as described in example 1. A solution suitable for spinning was prepared by diluting the reaction mixture with 2,850 parts by weight of N-methyl pyrrolidone. The hydrochloric acid formed was neutralised with 110 parts by weight of propylene oxide. This solution ($\eta$ = 1,100 Poises, $\eta_{rel.}$ = 2.79) was spun wet (draw-off rate: 18 m/min) and the resulting threads were stretched in the ratio of 1:10.5 at 440° – 470°C.

Properties of the threads:
| | |
|---|---|
| Tensile strength: | 14 – 18 g/dtex |
| Elongation: | 2 % |
| Modulus of elasticity: | 9200 ± 850 kg.wt./mm² |
| Moisture absorption: | 1.7 %. |

EXAMPLE 4

143.5 parts by weight of 4-amino-3'-(p-aminophenoxy)-benzanilide of the formula

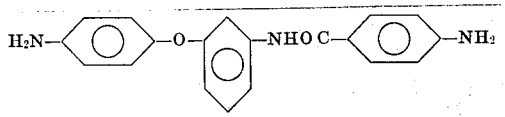

and 13.4 parts by weight of 3-(p-aminophenyl)-7-amino-2,4-(1H,3H)-quinazolinedione (10 mols-% based on the total quantity of diamine) were dissolved in 789 parts by weight of dimethylacetamide and then reacted with 101.5 parts by weight of terephthalic acid dichloride as described in example 1. The polyamide solution diluted to a solids content of 16.5 and neutralised with propylene oxide had a viscosity of 1,975 at 20°C. It was spun to threads as described in example 1. These threads were stretched in the ratio of between 1:7 and 8:5 on a roller at 440° to 460°C. The threads were found to have the following properties:

| | |
|---|---|
| Tensile strength: | 7.9 to 9.1 g/dtex |
| Elongation on tearing: | 1.5 % |
| Modulus of elasticity: | 9940 ± 1880 kg.wt./mm² |
| Moisture absorption: | 3.2 %. |

EXAMPLE 5

239 parts by weight of 4-amino-3'-(p-aminophenoxy)-benzanilide and 67.67 parts by weight of 3-(p-aminophenyl)-7-amino-2,4-(1H,3H)-quinazolinedione (25 mols-% based on the total quantity of diamine) and 203 parts by weight of terephthalic acid dichloride were polycondensed as described above. The neutralised solution was spun wet as described above and stretched (stretching temperature 470° to 510°C, stretching ratio 1:12), $\eta_{rel.}$ = 2.19

Properties of the threads:
| | |
|---|---|
| Tensile strength: | 11 – 13 g/dtex |
| Elongation on tearing: | 2 % |
| Modulus of elasticity: | 9200 ± 250 kg.wt./mm² |
| Moisture absorption: | 2.9 %. |

EXAMPLE 6

271 parts by weight of 4-amino-3'-(p-aminophenoxy)-benzanilide and 42 parts by weight of 3-(p-aminophenyl)-7-amino-2,4-(1H,3H)-quinazolinedione (15 mols-% based on the total quantity of diamine) were polycondensed with 203 parts by weight of terephthalic acid dichloride in N-methyl pyrrolidone. The polyamide solution which had a viscosity of 1,330 Poises ($\eta_{rel.}$ = 2.85) after dilution and neutralisation with propylene oxide was spun wet. The threads were stretched in the ratio of between 1:11.8 and 1:12.1 at 480° to 490°C. These threads were found to have the following properties:

| | |
|---|---|
| Tensile strength: | 15 – 17 g/dtex |
| Elongation on tearing: | 1.5 to 2 % |
| Modulus of elasticity: | 8700 ± 1300 kg.wt./mm² |
| Moisture absorption: | 1.8 %. |

EXAMPLE 7

266 parts by weight of 4-amino-3-methyl-3'-(p-aminophenoxy)-benzanilide of the formula

and 53.6 parts by weight of 3-(p-aminophenyl)-7-amino-2,4-(1H,3H)-quinazolinedione (20 mols-% based on the total quantity of diamine) were dissolved in 3,620 parts by weight of N-methyl pyrrolidone and polycondensed with 2,203 parts by weight of terephthalic acid dichloride. The solution was diluted, neutralised and spun wet as described above. The threads were stretched in the ratio of 1:8-10 at 470° to 480°C.

Properties of the threads:
| | |
|---|---|
| Tensile strength: | 10 – 12 g/dtex |
| Elongation on tearing: | 1.5 % |
| Modulus of elasticity: | 10700 ± 450 kg.wt./mm² |
| Water absorpotion capacity: | 2.1 % |

EXAMPLE 8

282 parts by weight of 4-amino-3'-(2''-chloro-4''-aminophenoxy)-benzanilide of the formula

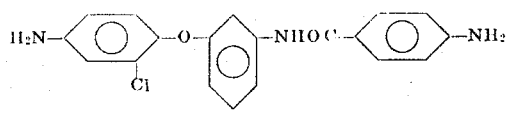

and 53.6 parts by weight of 3-(p-aminophenyl)-7-amino-2,4-(1H,3H)-quinazolinedione were polycondensed with 203 parts by weight of terephthalic acid dichloride as described in detail in example 1. After the solution had been diluted and neutralised with propylene oxide, it was spun wet. The resulting threads were stretched in the ratio of 1:9–10 at about 490°C. They were found to have the following properties:

| | |
|---|---|
| Tensile strength: | 9 – 11 g/dtex |
| Elongation on tearing: | 1.5 – 2% |
| Modulus of elasticity: | 8900 ± 800 kg.wt./mm² |
| Moisture absorpotion: | 2.0 %. |

We claim:

1. A high-molecular weight aromatic copolyamide, consisting essentially of 50 to 95 mols-% of structural units of the general formula I

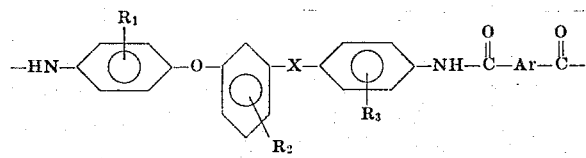

in which

X represents the group

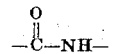

or

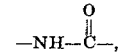

$R_1$ and $R_2$ are independent of each other and represent hydrogen, a $C_1$–$C_4$ alkoxy group, an alkyl group or halogen atom, $R_3$ represents hydrogen, halogen, a $C_1$–$C_4$ alkyl group, an alkoxy group, a nitrile group, a —$COOR_4$— or a $CONR_5R_6$ group, Ar represents a divalent aromatic group, $R_4$ representing hydrogen or a $C_1$–$C_4$ alkyl group and $R_5$ and $R_6$ representing, independently of each other, hydrogen, a $C_1$–$C_4$ alkyl group or an aryl group, and 5 - 50 mols-% of structural units which contain 2,4-(1H,3H)-quinazolinedione ring systems, which structural units are represented by the following general formula II

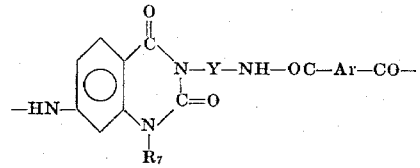

in which $R_7$ represents hydrogen or a $C_1$–$C_4$-alkyl group,

Y represents a bivalent aromatic group, consisting of one or more condensed aromatic rings or aromatic rings which are joined together by a single bond or by a —CO—, —$CR_7R_7$—, —O—, —S— or —$SO_2$— group, and their alkyl substitution or halogen substitution products, and Ar represents a divalent aromatic group, the copolyamides having a relative solution viscosity ($\eta_{rel.}$ determined on a 0.5 % solution of the copolyamide in concentrated sulphuric acid at 25°C) of 1.4 to 4.

2. The high-molecular weight copolyamide according to claim 1, which comprises from 5 to 50 mols-% of structural units which contain 2,4-(1H,3H)-quinazolinedione ring systems, which structural units are represented by the following formula

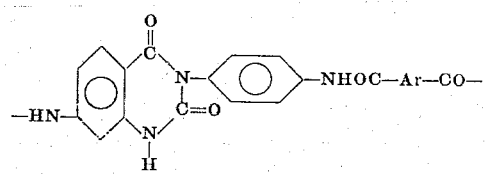

3. The high-molecular weight aromatic copolyamides according to claim 1, wherein the aromatic group Ar represents p-phenylene.

4. The high-molecular weight aromatic copolyamides according to claim 2, wherein the aromatic group Ar represents p-phenylene.

5. The high molecular weight copolyamide of claim 1 which consists of 50 to 95 mol percent of units having the formula I, and 5 to 50 mol percent of units having the formula II.

6. The high molecular weight copolyamide of claim 1 in which formula I is

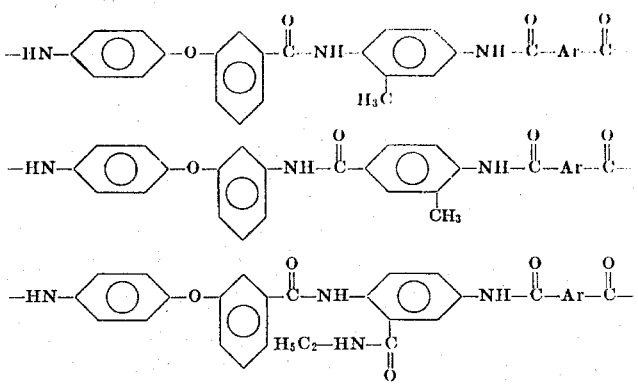

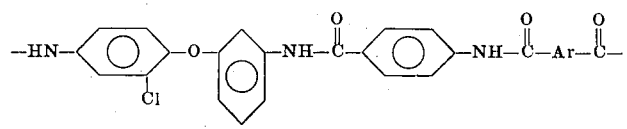
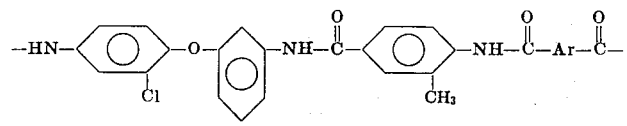
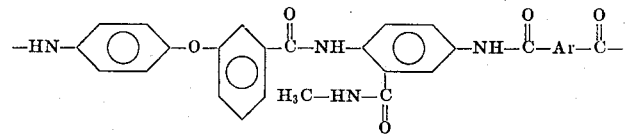
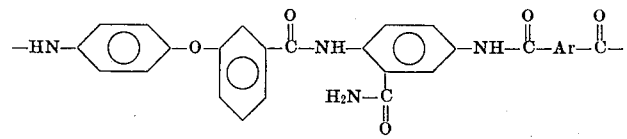
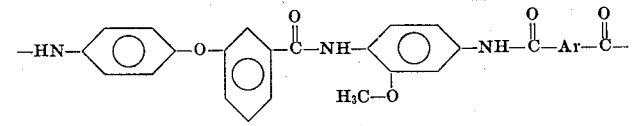
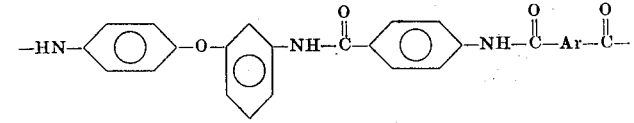
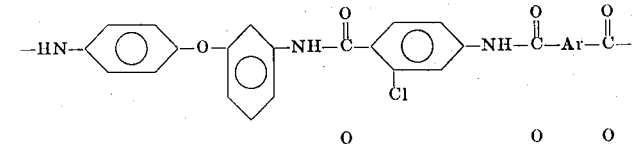
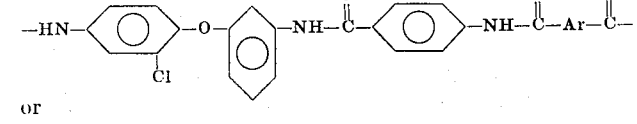
or
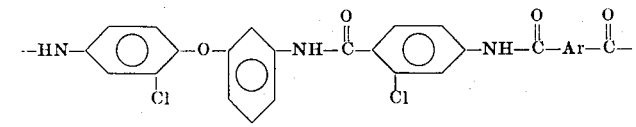
in which formula II is
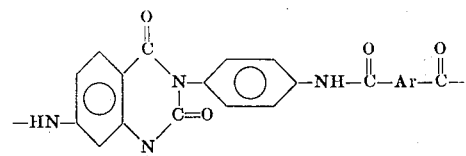
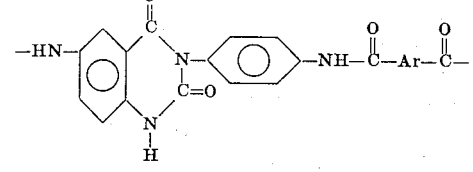
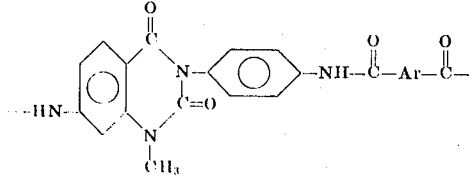
—Continued
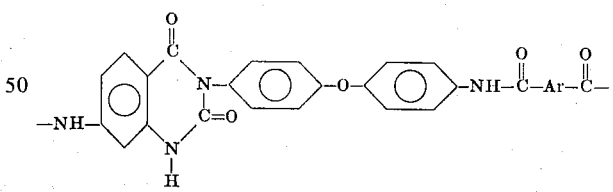
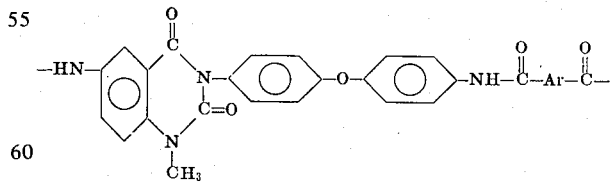
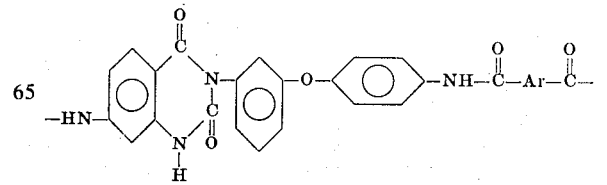

—Continued
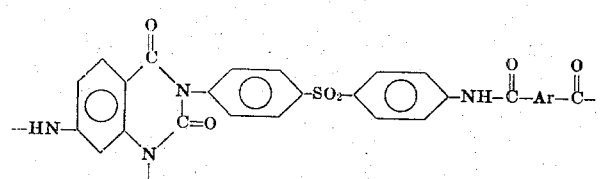
or
—Continued
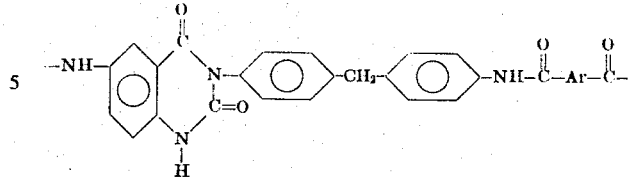
7. Fiber prepared from the high-molecular weight aromatic copolyamide of claim 1, having a tensile strength of between 7 and 22 g/dtex and modulus of elasticity of between 6,000 and 14,000 kg.wt./mm².
* * * * *